(12) United States Patent
Reisch et al.

(10) Patent No.: US 8,245,590 B2
(45) Date of Patent: Aug. 21, 2012

(54) DEVICE FOR TRANSMITTING A TORQUE

(75) Inventors: Matthias Reisch, Ravensburg (DE); Mark Mohr, Tettnang (DE); Ralf Dreibholz, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 564 days.

(21) Appl. No.: 12/445,329

(22) PCT Filed: Oct. 2, 2007

(86) PCT No.: PCT/EP2007/060455
§ 371 (c)(1),
(2), (4) Date: Apr. 13, 2009

(87) PCT Pub. No.: WO2008/046735
PCT Pub. Date: Apr. 24, 2008

(65) Prior Publication Data
US 2009/0301243 A1    Dec. 10, 2009

(30) Foreign Application Priority Data
Oct. 19, 2006  (DE) .......................... 10 2006 049 273

(51) Int. Cl.
*F16H 3/14* (2006.01)
*F16H 3/08* (2006.01)
(52) U.S. Cl. ................ 74/372; 74/355; 74/364; 74/365
(58) Field of Classification Search ............. 74/355–372
See application file for complete search history.

(56) References Cited

U.S. PATENT DOCUMENTS

| 2,401,192 A * | 5/1946 | Rovick .......................... 384/589 |
| 5,666,854 A | 9/1997 | Buri et al. |
| 5,749,263 A | 5/1998 | Buri et al. |
| 6,779,416 B2 * | 8/2004 | Buri ................................ 74/331 |
| 6,993,991 B2 | 2/2006 | Baasch et al. |

FOREIGN PATENT DOCUMENTS

| DE | 426 750 | 3/1926 |
| DE | 680 423 | 8/1939 |
| DE | 43 05 103 A1 | 9/1994 |
| DE | 43 16 233 A1 | 11/1994 |
| DE | 43 25 964 A1 | 1/1995 |
| DE | 196 23 773 A1 | 12/1997 |
| DE | 102 06 584 A1 | 9/2003 |
| DE | 103 02 502 A1 | 9/2004 |
| EP | 0 753 687 A1 | 1/1997 |
| GB | 402 221 | 11/1933 |
| WO | 2007/099155 A1 | 9/2007 |

* cited by examiner

*Primary Examiner* — Tisha Lewis
(74) *Attorney, Agent, or Firm* — Davis & Bujold, P.L.L.C.

(57) ABSTRACT

A device (1) for transmitting torque from a first shaft (2) to a second shaft (3) of a transmission device, in particular a counter shaft transmission. The device (1) has a first gear (5) supported on the first shaft (2) by a bearing device (4) and which, in an assembled state, engages a second gear (6) arranged on the second shaft (3). The first gear (5) can be shifted into an activated state in which the first gear is connected in a rotationally fixed manner to the first shaft (2). A supporting mechanism (18) is associated with the first gear (5), next to the bearing device (4), via which tilting moments present and acting on the first gear (5), at least in a connected state, are transmitted to and supported by the first shaft (2).

17 Claims, 5 Drawing Sheets

DEVICE FOR TRANSMITTING A TORQUE

This application is a National Stage completion of PCT/EP2007/060455 filed Oct. 2, 2007, which claims priority from German patent application serial no. 10 2006 049 273.0 filed Oct. 19, 2006.

FIELD OF THE INVENTION

The invention concerns a device for transmitting a torque from a first shaft to second shaft of a transmission device, in particular a countershaft gearbox.

BACKGROUND OF THE INVENTION

Countershaft transmissions, double-clutch gearboxes, automatic transmissions, manual transmissions or similar devices known from the prior art are usually designed with gears rotatably mounted on a shaft that engage with other gears non-rotatably mounted on a shaft, thereby forming gear pairings. By alternating non-rotating connections between gears mounted rotatably on the shaft, it is possible to connect the gear pairings to form different gear ratios of a countershaft transmission in the drive train of a countershaft transmission by means of appropriate shifting elements, such as synchronizations, dog-clutches or frictional elements.

The shifting elements provided for connecting the gear pairings are mechanically, hydraulically, pneumatically or magnetically actuated internally or externally in relation to the shaft on which the rotatably mounted gears or idlers of a countershaft transmission are arranged.

DE 102 06 584 A1, DE 43 25 964 A1 as well as DE 103 02 502 A1 represent the general state of the art as it applies to actuating shifting elements from the interior of a shaft outward for the purpose of engaging and disengaging idlers or gear pairings.

Actuating shifting elements of a transmission device externally is customarily performed using shift forks or similar devices, while the actuation of the shifting elements from within the shaft holding the idlers characteristically requires less radial construction space compared to actuating the idlers externally in relation to the surface of the shaft, owing to the shifting action within the shaft. In contrast thereto, transmission devices in which the idlers are actuated from within require more axial space than transmission devices in which the shifting elements are actuated externally.

This results from the fact that the actuating force required for actuating the idlers from within the shaft holding the idlers must be conducted to the shifting elements also arranged on the shaft holding the idlers and interposed between the idlers. Since neither the bearing width of the idlers arranged on the shaft nor the axial space required by the shifting elements can be modified and the guidance of actuating force through the shaft into these areas is only possible under certain conditions, the shifting elements must be actuated from within in areas of the shaft that are not functionally stressed by the idlers or shifting elements. This means that free areas of the shaft are required which, however, can only be made available by elongating the shaft.

Making the gear pairings of a preselector gearbox toothed at an angle to minimize noise during transmission device operation further increases the amount of axial space required for a transmission device. The increased axial space requirement results from the fact that an axially shifted axial force is conducted into the gears in addition to the normal and peripheral forces in the area of the activated gear pairings toothed at an angle, by means of which torque is transmitted from one shaft to another shaft of a transmission device.

When a transmission device is designed with asymmetrically arranged shafts, tilting moments resulting from the axially displaced, axial forces exerted on the activated gears, thereby causing a skewing of the gears. This type of angled gearing leads to undesired noise increases during the operation of the transmission device as well as shortened service life, whereby both of these phenomena increase as skewing becomes more pronounced, for which reason gear skewing must be limited to only a few angular minutes.

Gear skewing is minimal, if the gears are mounted on the shafts by means of sufficiently stiff bearings, whereby this requirement can be implemented in the design of fixed gears more easily than in the case of idlers. To create idler bearings with the desired stiffness, the idler bearings must be designed with appropriate bearing widths. For reasons of cost, idler bearings are generally realized as wide needle bearings, sometimes as double-rowed needle bearings, whereby the required bearing widths of the idlers have a negative influence on the overall length of the transmission and a transmission device requires a very large amount of axial space when shifting elements are actuated from within, i.e. from the shaft outward.

SUMMARY OF THE INVENTION

The object of the current invention is to provide a device for transmitting torque from a first shaft to a second shaft of a transmission device with a first gear rotatably mounted on the first shaft with which it is ultimately possible to design a transmission device that requires less axial space than in conventional transmission devices.

In the inventive device for transmitting torque from a first shaft to a second shaft of a transmission device, in particular a countershaft transmission, with a first gear rotatably mounted on the first shaft by means of a bearing device that, in mounted state engages a second gear arranged on the second shaft, whereby the first gear can be conveyed into a connected state in which the first gear is nonrotatably connected to the first shaft, a supporting mechanism is assigned to the first gear by means of which tilting moments present next to the bearing device and acting on the first gear at least in connected state can be conducted into the shaft and supported there.

For this reason, a supporting mechanism which supports tilting moments and is next to the bearing device is associated with, at least in connected state, i.e. torque-transmitting state, what is referred to as an idler of a transmission device, which is acted upon by appreciable tilting moments primarily only in an activated condition, so that the connected idler or the first gear is designed with a stiffer bearing in a connected state than in a disconnected state.

BRIEF DESCRIPTION OF THE DRAWINGS

The patent claims and the drawings to which they refer illustrate advantageous improvements of the inventive object. For the sake of clarity, the description of the various embodiments uses identical reference numbers for components of the same construction and function.

Drawings.

DETAILED DESCRIPTION OF THE PREFERRED EMBODIMENTS

Figure 1:
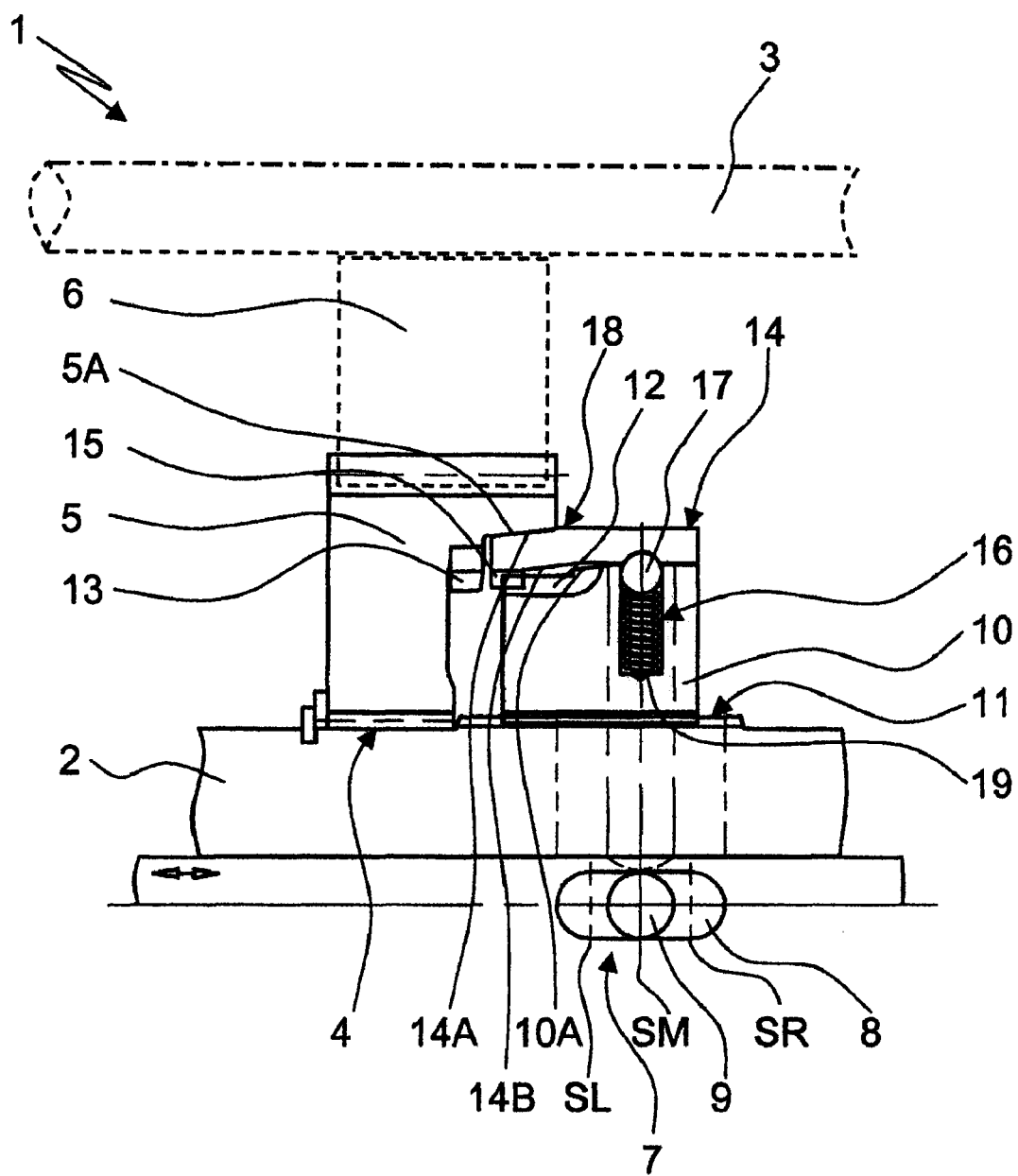
FIG. 1 A first embodiment of a device for transmitting a torque from a first shaft to a second shaft of a countershaft transmission.

FIG. 1 shows a device 1 for transmitting a torque from a first shaft 2 to a second shaft 3 of a countershaft transmission with a first gear 5 rotatably mounted on the first shaft 2 by means of a bearing device 4 that engages a second gear 6 arranged on a second shaft 3 in assembled state. The first gear 5 is designed as what is referred to as an idler and can be conveyed by means of an actuating device 7 into an activated condition in which the first gear 5 is rotationally fixed to the first shaft 2 and a torque can be conducted from the first shaft 2 to the first gear 5.

The torque conducted into the first gear 5 is then transmitted by means of the second gear 6 engaging the first gear 5 and onto the second shaft 3 as a result of the second gear 6 being designed as what is referred to as a fixed gear, which is nonrotatably connected to the second shaft 3.

Deviating from this example, the device 1 can also be employed in other transmission devices, such as manual transmissions, automatic transmissions, double-clutch gearboxes or planetary gearboxes, to conduct torque from a first shaft to a second shaft as well as for automatically actuating a transmission device during shifting procedures and similar actions.

The actuating device 7 comprises a pin 9 arranged in a slot 8 of the first shaft 2 so that it is longitudinally displaceable in axial direction of the first shaft 2 which penetrates the first shaft 2 in radial direction and is functionally connected to a selector sleeve 10 of the actuating device 7, whereby axial movement of the pin 9 causes the selector sleeve 10 to move axially in relation to the first shaft 2.

The selector sleeve 10 in question is nonrotatably attached to the first shaft 2 by means of a sliding spline 11, arranged to axially displace on the shaft 2 and is designed in certain areas on its outer circumferential surface facing away from the first shaft with a toothed profile 12 that can engage a toothed profile 13 of the first gear 5 when the selector sleeve 10 is in the appropriate axial position. The toothed profile 12 of the selector sleeve 10 and the toothed profile 13 of the first gear 5 form what is referred to as a locking teeth for the first gear 5, whereby the first gear 5 is nonrotatably attached to the first shaft 2 as the result of a positive locking connection when the toothed profiles 12 and 13 engage one another.

In addition, the outer circumference of the selector sleeve 10 is provided with an essentially hollow cylindrical part 14, which, in the selector sleeve 12 position illustrated in FIG. 1, engages the toothed profile 12 of the selector sleeve 10 by means of its own toothed profile 15 and is thereby nonrotatably connected to the selector sleeve 12 as well as to the first shaft 2. Furthermore, a relative movement between part 14 and the selector sleeve 10 by means of a blocking body 17 pressed against part 14 by means of a spring mechanism 16 is not possible, until an axial actuating force equivalent to the spring force of the spring mechanism 16 and acting on the selector sleeve 10 is overcome.

Part 14 as illustrated represents a part of a supporting mechanism 18 associated with the first gear 5 by means of which tilting moments acting on the first gear 5 next to the bearing device 4 at least in connected state can be conducted into the first shaft 2 and supported. The tilting moments essentially result from the angularly toothed gears 5 and 6 engaging one another and have a negative impact on the development of noise and the service life of the teeth of the two gears 5 and 6 as the skewing of the gears 5 and 6 coming together increases when the first gear 5 is in connected state.

To facilitate conducting tilting moments appearing in the area of the idler or the first gear 5 when the first gear 5 is in connected state into the first shaft 2 to the desired extent, the actuating device 7 connected to the supporting mechanism 18 employs the mode of operation described below.

Starting with the first gear 5 in completely disconnected state, in which the pin 9 is in a first shifting position SR, part 14 is arranged with an area of essentially conical construction 14A offset from an area also of essentially conical construction 5A of the first gear 5.

When it is necessary to engage the first gear 5 or to nonrotatably connect the first gear 5 to the first shaft 2, the pin 9 of the actuating device 7 is guided further in the direction of the second shifting position SM illustrated in FIG. 1, causing area 14A of part 14 to become further frictionally engaged with area 5A of the first gear 5. The frictional engagement between area 5A of the first gear 5 with area 14A of part 14, causes a speed differential between the first gear 5 and the first shaft 2 to be compensated for with increasing actuating force of the actuating device 7.

If the actuating force of the actuating device 7 exceeds the blocking force exerted on the blocking body 17 by the spring mechanism 16, then the blocking body 17 is pressed into a hole 19 receiving the spring mechanism 16 as the result of a movement of the selector sleeve 10 in relation to part 14, and the selector sleeve 10 is axially displaced increasingly in the direction of the axially nondisplaceable first gear 5. As the adjustment travel of the selector sleeve 10 increases, the primarily conical area 10A of the selector sleeve comes into contact with a likewise conical second area 14B of the part. In a third shifting position SL of the pin 9 of the actuating device 7, the toothed profile 12 of the selector sleeve 10 fully engages the toothed profile 13 of the first gear 5 and area 10A of the selector sleeve 10 additionally abuts the second area 14B of part 14 without any play, whereby the first gear 5 is completely connected in this state of the actuating device 7.

A tilting moment acting on the first gear 5 can thus be conducted via the area 5A and the first area 14A of part 14 into part 14 of the supporting mechanism 18 and can in turn be supported to the desired degree in the contact areas between the second area 14B of part 14 and of the area 10A of the selector sleeve 10 on the first shaft via the selector sleeve 10.

The pin 9 can be actuated mechanically, hydraulically, pneumatically, magnetically or by means of any desired combination of the actuation options listed above and can be displaced axially relative to the shaft 2 or the first gear 5 in order to connect the first gear 5 in the manner previously described or disconnect it by bringing the pin 9 from its third shifting position SL into first shifting position SR and releasing the non-rotating connection between the first gear 5 and the first shaft 2.

Figure 2:
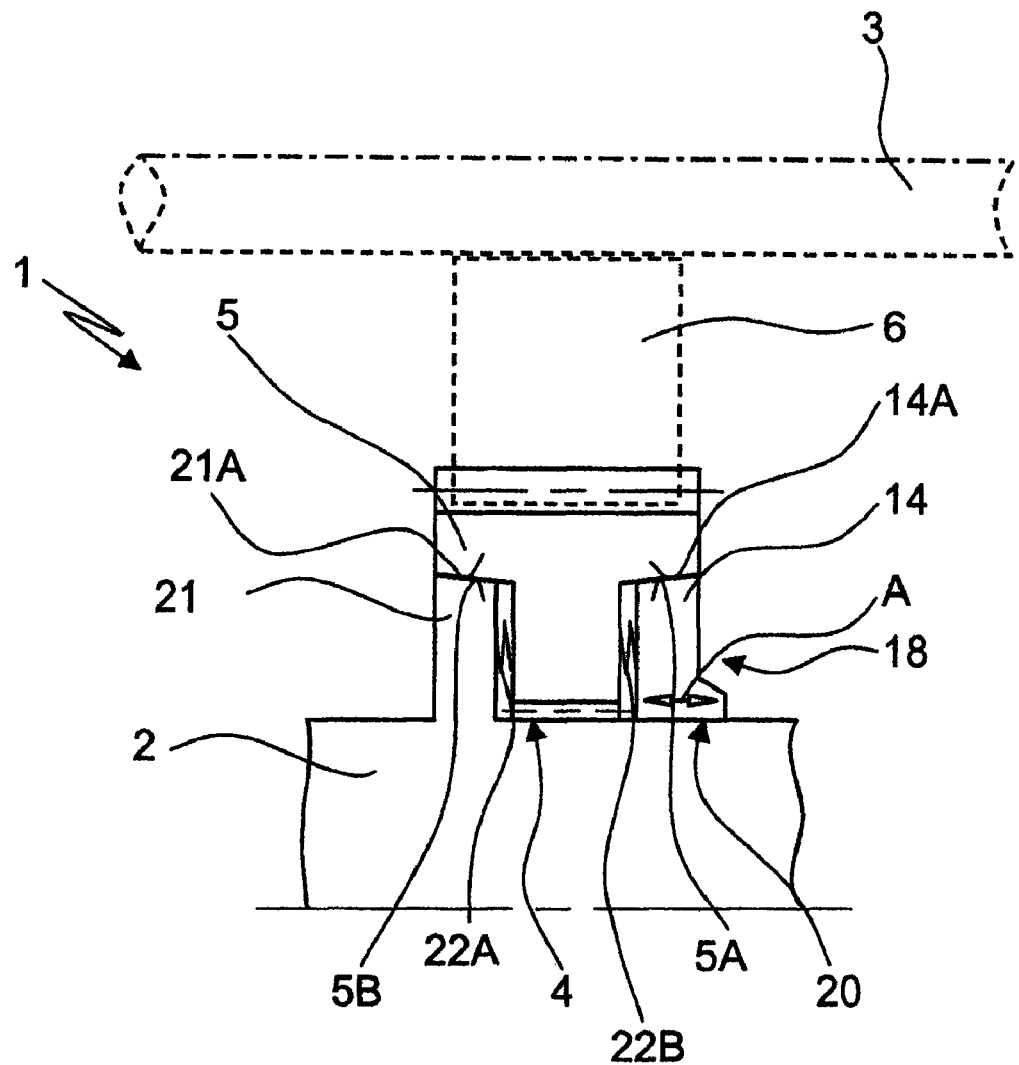
FIG. 2 A second embodiment of a device for transmitting a torque with a supporting mechanism assigned to a first gear.

FIG. 2 shows a second embodiment of device 1 for transmitting a torque from the first shaft 2 into the second shaft 3 of a countershaft transmission, whereby the part 14 is designed as primarily plate-like and is displaceable relative to the first shaft 2 in the directions indicated by the double arrow A by means of a sliding bearing device 20.

Area 14A of part 14 is primarily conical and frictionally locks to the also conically shaped area 5A of the first gear 5 to form a functional connection in the manner illustrated in FIG. 2 when the first gear 5 is in connected state. Furthermore, associated with the first gear 5 on the side facing away from part 14 is a shaft collar 21 which is constructed in a conical manner on its circumferential surface 21A facing the first gear 5 and acts together with a second area 5B designed to be equivalent to area 5A of the first gear 5, by means of which tilting moments acting on the first gear 5 can be supported in the area of the shaft collar 21 in the same manner as in part 14.

In this example, the first gear 5 is arranged on the first shaft 2 to axially displace in the direction of the first shaft 2, so that the first gear 5 can be displaced in the direction of the shaft collar 21 when in a connected state in which part 14 is displaced in the direction of the shaft collar by an actuating device 7 of the type shown in FIG. 1 not illustrated in further detail in FIG. 2.

When part 14 makes contact with the first gear 5 in the appropriate manner, the first gear 5 is displaced in the direction of the first shaft collar 21, whereby a force equilibrium exists in the contact area 5B between area 5B of the gear 5 and area 21A of the shaft collar 21, as well as between area 14A of part 14 and area 5A of the first gear 5 when the first gear 5 is in final position or when the first gear 5 is in completely activated state.

In this present example, the slopes of the conical surfaces of areas 5A, 14A, 5B and 21A are smaller than what is referred to as the frictional angle, so that the first gear 5 is automatically released from its contact with the first gear 5 and can freely rotate in relation to the first shaft 2 when the actuating device 7 is disengaged, i.e. when the actuating force for part 14 is disconnected. To support a release action of the first gear 5, a spring mechanism 22A, 22B is provided between both the shaft collar 21 and the first gear 5 as well as between the first gear 5 and part 14. In this setup, the spring mechanism 22A presses the first gear 5 in the direction of part 14, while the spring mechanism 22B exerts a spring force directed away from the first gear 5 on part 14.

In an improvement not further illustrated in the drawing of the second embodiment of the inventive device 1 shown in FIG. 2, the first gear 5 is produced in addition to the frictional locking connections between gear 5 and the shaft collar 21 as well as between the gear 5 and part 14 by means of a lock gearing further illustrated in FIG. 1 between the first gear 5 and a selector sleeve connected in a nonrotating manner with the first shaft 2, in order to securely ensure the non-rotating connection of the between the first gear 5 and first shaft 2 in all operating situations of the preselector gearbox.

Figure 3:
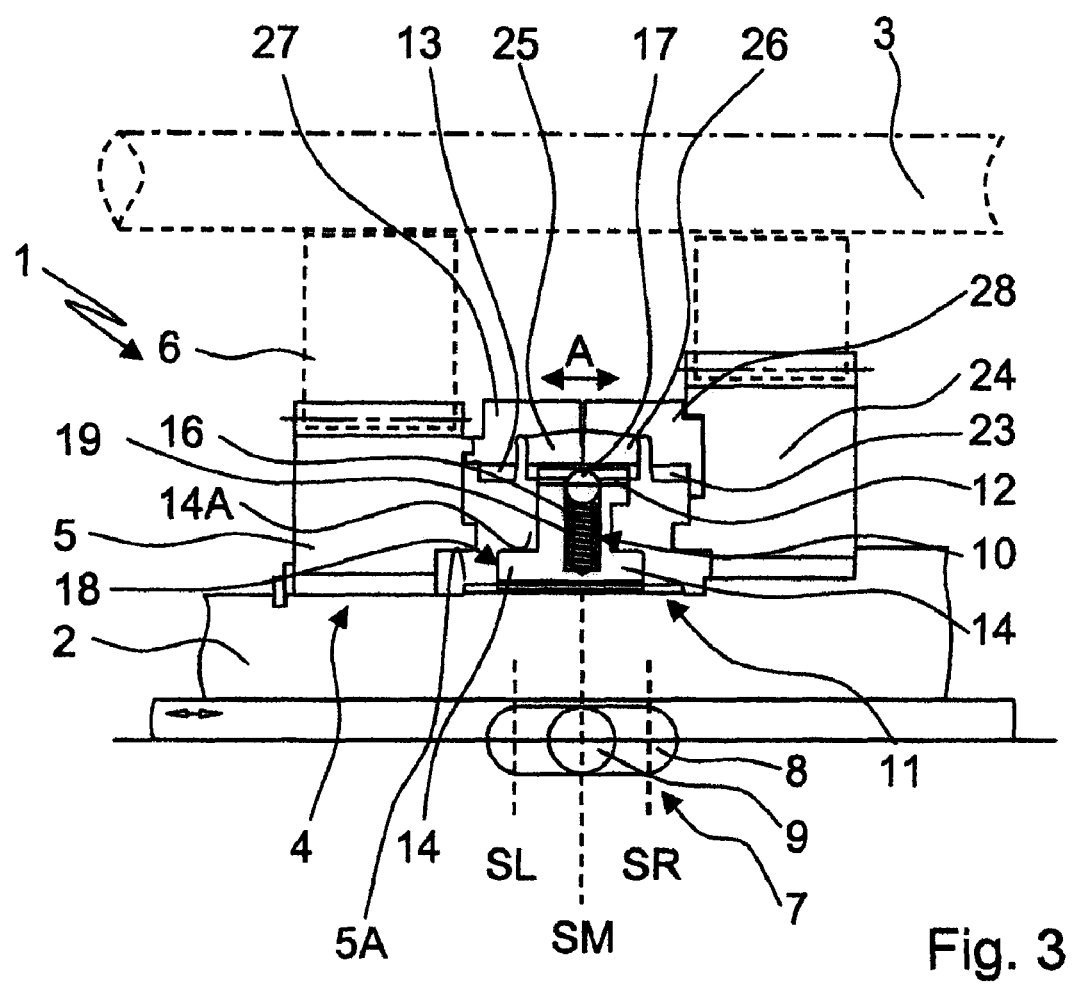
FIG. 3 A third embodiment of a device for transmitting a torque with a shifting element for an alternating connection of two gears designed as idlers.

FIG. 3 illustrates a third embodiment of the device 1 for transmitting torque from the first shaft 2 to the second shaft 3 of a countershaft transmission, in which the selector sleeve 10 can be displaced in axial direction relative to the first shaft in the directions indicated by the double arrow and the toothed profile 12 thereof can engage the toothed profile 13 of the first gear 5 or a toothed profile 23 of a third gear 24 to nonrotatably connect either the first gear 5 or the third gear 24 to the first shaft 2 by means of a positive fit.

In this example, the selector sleeve 10 is part of a synchronization that essentially features a known design. FIG. 3 illustrates the second shifting position SM of the pin 9, wherein the selector sleeve 10 is connected through positive locking neither to the first gear 5 nor to the third gear 24. In the second shifting position SM, the selector sleeve 10 is connected through positive locking to a first synchronizer ring 25 as well as a second synchronizer rings 26 via the toothed profile 12. The exteriors of the synchronizer rings 25 and 26 facing away from the selector sleeve 10 are conical in form and can be each brought into a frictionally locking functional connection via their conical surfaces with a respective mating cone of an additional synchronizer ring 27 or 28 nonrotatably connected to the first gear 5 or the third gear 24.

In addition to this, the synchronizer rings 25 and 26 connected through positive locking to the selector sleeve 10 in the middle shifting position SM of the pin 9 are blocked by the blocking body 17 pressed by the spring mechanism 16 in the direction of the synchronizer rings 25 and 26 until reaching a force component equivalent to the spring force of the spring mechanism 16 against an axial movement in relation to the selector sleeve 10.

This means that the synchronizer ring 25 is increasingly brought into an engaged position with the conical surface of the other synchronizer ring 27 nonrotatably connected to the first gear 5, when the selector sleeve 10 is displaced axially starting from the second shifting position SM in the direction of the third shifting position SL of the pin 9, thereby compensating a speed differential between the first shaft 2 and the first gear 5 through frictional engagement.

As actuating force exerted on the selector sleeve 10 increases, the spring force of the spring mechanism 16 is overcome, once a threshold force component is exceeded and the blocking body 17 is pressed into the hole 19. In this condition of the actuating device 7 the selector sleeve 10 moves relative to the synchronizer ring 25 connected through positive locking to the selector sleeve 10 and its toothed profile 12 engages the toothed profile 13 of the other synchronizer ring 27. During the axial displacement of the selector sleeve 10 starting from the second shifting position SM of the pin 9 in the direction of the third shifting position SL, part 14, realized here as one piece with the selector sleeve 10, is shoved into a cylindrical recess between the first gear 5 and the second shaft 2 to facilitate conducting the tilting moments acting on the first gear 5 into the first shaft 2 via part 14.

Displacing the selector sleeve 10 in the direction of the first shifting position SR of the pin 9 starting from the second shifting position SM of the pin 9 compensates for a speed differential between the first shaft 2 and the third gear 24 by means of increasing friction between the two synchronizer rings 26 and 28. Just before the synchronization state between the third gear 24 and the first shaft 2, the toothed profile 12 of the selector sleeve 10 engages the toothed profile 12 of the other synchronizer ring 28, which is nonrotatably connected to the third gear 24 designed as idler.

Figure 4:
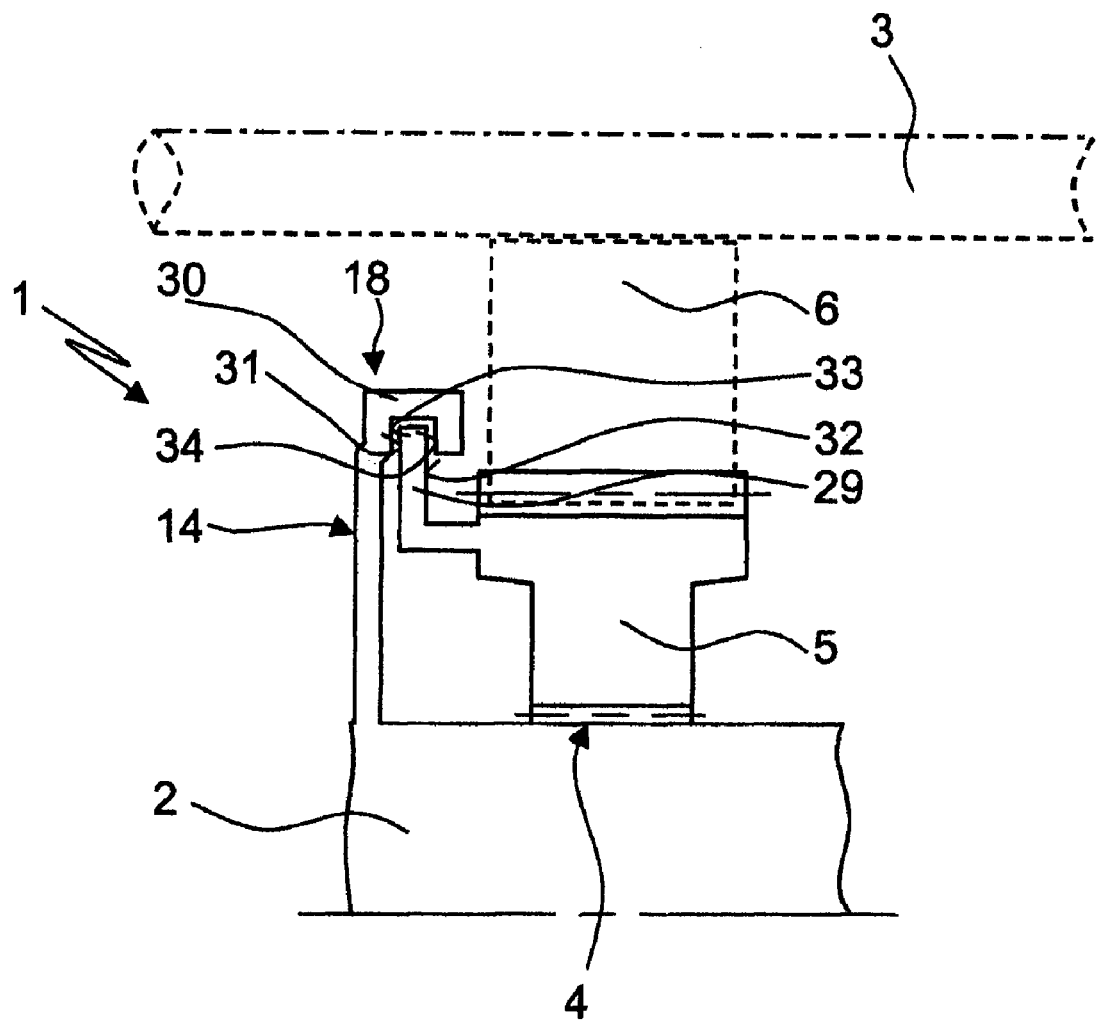
FIG. 4 A fourth embodiment of a device for transmitting a torque.

FIG. 4 illustrates a fourth embodiment of the inventive device I in which the first gear 5 designed as idler engages a supporting element 29 fixedly connected to the first gear 5 in a segment 30 of at least an approximately U-shaped cross section of part 14 fixedly connected to the first shaft 2 to facilitate conducting a tilting moment acting on the first gear 5 into the first shaft 2 and supports it there.

In this example, the supporting element 29 engages a plate-like area in the at least nearly U-shaped segment 30 of part 14. The plate-like area of the supporting element 29 is designed with two plane surfaces 31, 32, each of which engages a plane surface 33 or 34 of part 14 for supporting a tilting moment acting on the first gear 5. In a condition when the first gear 5 is free of tilting moments, the plane surfaces of the supporting element 29 and part 14 of the supporting mechanism 18 are arranged displaced from one another to facilitate an optimally torque-free state of the first gear 5 when the first gear 5 is disconnected.

Figure 5:
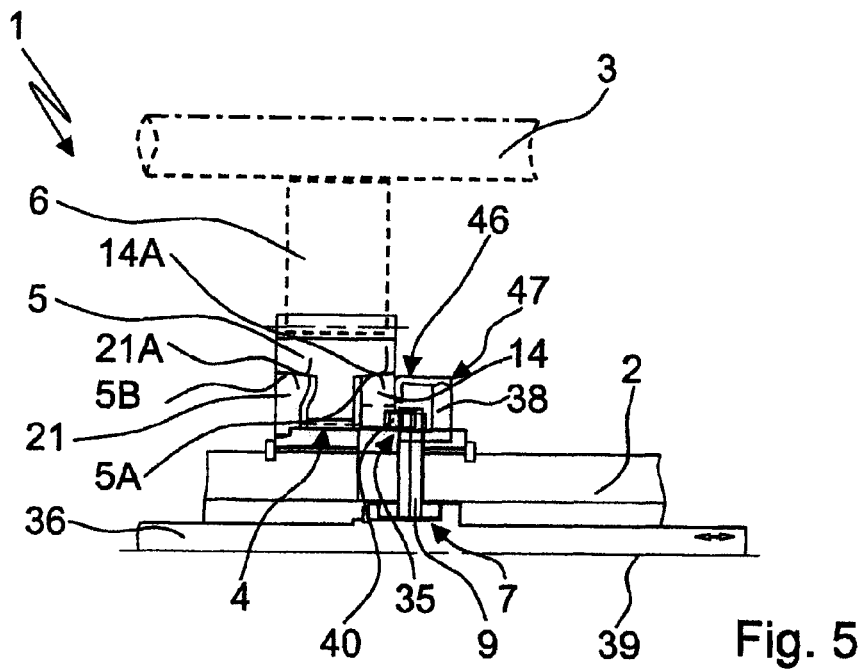
FIG. 5 A fifth embodiment of a device for transmitting.

Because FIG. 5 illustrates a fifth embodiment of the inventive device 1, where the supporting mechanism 18 of the device 1 shown in FIG. 5 is essentially the same as the supporting mechanism 18 shown in FIG. 2, details of the basic construction of the supporting mechanism illustrated in FIG. 5 can be found in the description to FIG. 2.

Figure 6:
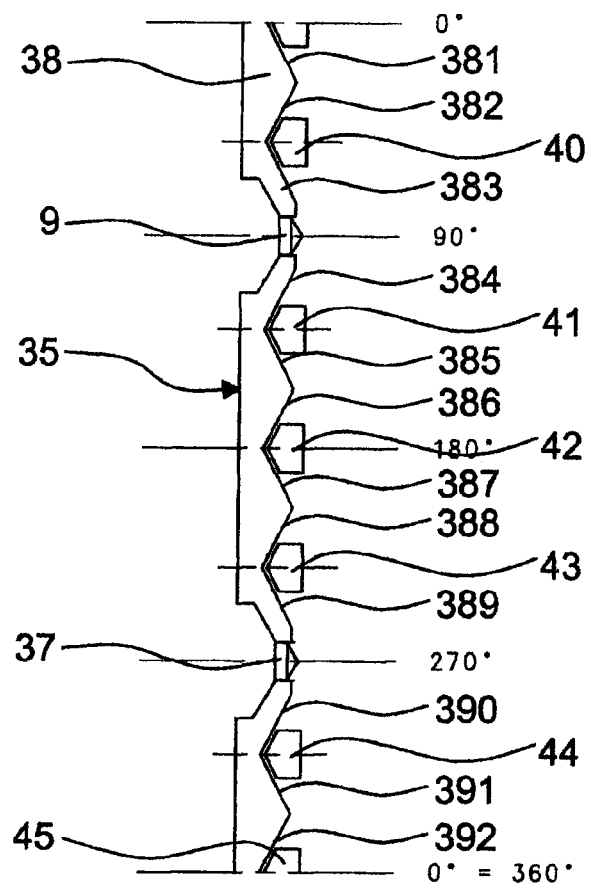
FIG. 6 A developed view of a ramp system of an actuating device to actuate the supporting mechanism of the device illustrated in FIG. 5.

The device 1 illustrated in FIG. 5 is designed with an actuating device 7 that features a ramp system described in greater detail in FIG. 6. The actuating device 7 penetrates the first shaft 2 with a pin 9 that displaces axially in relation to the first shaft 2 and can be conveyed by means of a shift rod 36 which can axially displace in the first shaft 2. In addition to the pin 9 illustrated in FIG. 5, the actuating device 7 comprises an additional pin 37 that, together with pin 9, functions in concert with an actuating element 38 mounted rotatably and axially displaceable on the first shaft 2. In this way, the actuating element 38 can be connected nonrotatably to the first shaft 2 by means of the displaceable pins 9 and 37 acting as blocking element depending on a shifting position of the actuating device 7 or can be rotated relative to the first shaft 2.

The ring-shaped actuating element 38 is designed with slopes 381 to 392, each comprising an angle with a cross sectional plane perpendicular to the line of symmetry 39 of the first shaft 2 and in the area of slopes facing one another 392 and 381, 382 and 383 and 384 and 385, 386 and 387, 388 and 389 as well as 390 and 391 form a functional connection via actuating bodies 40 to 45 rigidly connected to the first shaft 2 to form a functional connection in which the actuating element 38, when able to rotate in relation to the first shaft 2, exerts an actuating force acting in the exertion direction with the first gear 5 on part 14, when there is a speed differential between the first shaft 2 and the first gear 5. For this reason, the angle between the cross sectional planes and the slopes 381, 383, 385, 387, 389 and 391 as well as the slopes 382, 384, 386, 388, 390 and 392 are designed differently, since different drag torques are present in coasting mode and traction mode.

Additionally, a spring mechanism 46 is provided between the actuating element 38 and part 14 by means of which a synchronizing force compensating for a speed differential between the first gear 5 and the first shaft can be exerted on part 14, when the first gear 5 is connected. If a limit for the actuating force exerted on part 14 by the actuating element is exceeded, a functional connection 47 between the spring mechanism 46 and the actuating element 38 inhibiting a relative movement between the actuating element 38 and part 14 is disengaged and part 14 is directly actuated by the actuating element 38 in the direction of the first gear 5, so that the first gear 5 is nonrotatably connected to the first shaft 2 by means of the frictionally locking connection between part 14 and the first gear 5 and, in addition, tilting moments acting on the first gear 5 can be conducted via part 14 into the first shaft 2.

In general, a gear designed as an idler of a countershaft transmission can be arrested in the inventive device described above by inserting at least a cylindrical part, a conical part or by disposing a plane surface of the first gear on at least a plane surface rigidly attached to the shaft in activated state on the shaft assigned to the idler and a tilting moment acting on the idler can be conducted into the shaft via the inserted part or plane surfaces and support it there.

The actuation of the inserting part or disposing of the idler on a plane surface can be realized mechanically, hydraulically, pneumatically, by means of an electric motor or through a combination of these methods, whereby a ramp system illustrated in FIG. 5 and FIG. 6 is also suitable, which owing to the drag torques appearing during the operation of a countershaft gearbox, arrests and supports the gear in the manner described above.

Additionally, the actuating force for arresting the gear via the part as well as by means of a shift rod arranged outside the shaft and acting together with a corresponding actuator can be applied to the appropriate parts to arrest one or more idlers in the manner described above and conduct prevailing tilting moment into the shaft assigned to the idlers and support it there.

REFERENCE NUMBERS

1 Device
2 First shaft
3 Second shaft
4 Bearing device
5 First gear
5A Area
BB Second area
6 Second gear
7 Actuating device
8 Slot
9 Pin
10 Selector sleeve
10A Area
11 Sliding spline
12 Toothed profile
13 Toothed profile
14 Part
14A Area
14B Second area
15 Toothed profile
16 Spring mechanism
17 Blocking body
18 Supporting mechanism
19 Hole
20 Sliding bearing device
21 Shaft collar
21 Circumferential surface
22A, B Spring mechanism
23 Toothed profile
24 Third gear
25 Synchronizer ring
26 Synchronizer ring
27 Additional synchronizer ring
28 Additional synchronizer ring
29 Supporting element
30 Segment
31 Plane surface
32 Plane surface
33 Plane surface
34 Plane surface
35 Ramp system
36 Shift rod
37 Pin
38 Actuating element
39 Line of symmetry
40 to 45 Actuating bodies
46 Spring mechanism
47 Functional connection
381 to 392 Slopes

The invention claimed is:

1. A device (1) for transmitting torque from a first shaft (2) to a second shaft (3) of a transmission, the device (1) comprising:
a first gear (5) being rotationally supported on the first shaft (2) by a bearing (4),
the first gear (5), in an assembled state, engaging a second gear (6) arranged on the second shaft (3), the first gear (5) being shiftable into an activated state in which the first gear (5) is connected, in a rotationally fixed manner, to the first shaft (2), a supporting mechanism (18) having a part (14) that is axially moveable, along the first shaft, with respect to both the first gear (5) and the first shaft (2), and the part, during engagement, only frictionally engaging with the first gear (5);

the supporting mechanism (18) being associated with the first gear (5) via which a tilting moment acting on the first gear (5), at least in the connected state, in addition to the bearing (4) are transmitted to and supported by the first shaft (2);

wherein a spring mechanism (16, 22B, 46) biases the part into a first position.

2. The device according to claim 1, wherein the part (14), at least when the first gear (5) is in the connected state, is arranged between an area (5A) of the first gear (5) and the first shaft (2) and the tilting moment acting on the first gear (5) is transmitted to and supported by the first shaft (2).

3. The device according to claim 2, wherein an area (14A) of the part of the supporting mechanism (18), in effective connection with the first gear (5) during the activated state of the first gear (5), has a cylindrical shape and engages with the area (5A) of the first gear (5) that has a mating cylindrical shape.

4. The device according to claim 2, wherein an area (14A) of the part of the supporting mechanism (18), in an effective connection with the first gear (5) when the first gear (5) is in the activated state, has a conical construction and engages with the area (5A) of the first gear (5) that has a mating conically construction.

5. The device according to claim 2, wherein the part (14) is displaced axially by an actuating mechanism (7) that is at least one of actuated mechanically, pneumatically and by an electric motor.

6. The device according to claim 3, wherein a speed differential between the first gear (5) and the first shaft (2) is compensated for by frictional engagement between the area (14A) of the part (14) of the supporting mechanism (18) and the area (5A) of the first gear (5).

7. The device according to claim 5, wherein the part (14) is functionally connected, via a toothed profile (15), to a selector sleeve (10) of the actuating mechanism (7) which is attached, in a rotationally fixed manner, to the first shaft (2) and is axially slidable on the first shaft (2), and a toothed profile (12) of the selector sleeve (10) engages a toothed profile (13) of the first gear (5) to provide a form-fitting connection of the first gear (5).

8. The device according to claim 7, wherein relative movement between the part (14) and the selector sleeve (10) is blocked by a spring-loaded blocking body (17), and the toothed profile (12) of the selector sleeve (10) is un-engageable with the toothed profile (13) of the first gear (5) until a defined actuating force of the actuating mechanism (7), equivalent to the spring force acting on the blocking body (17), is overcome.

9. The device according to claim 5, wherein the actuating mechanism (7) has a ramp system (35) that has an axially displaceable actuating element (38) rotatably mounted on the first shaft (2) and is rotationally securable to the first shaft (2) by at least one displaceable pin (9, 37).

10. The device according to claim 9, wherein the actuating element (38) has at least two slopes (381 to 392) each comprising an angle with a cross sectional plane perpendicular to a line of symmetry (39) of the first shaft (2) and in an area of the slopes facing one another (392 and 381, 382 and 383 and 384 and 385, 386 and 387, 388 and 389 as well as 390 and 391) forms a functional connection via actuating bodies (40 to 45) rigidly connected to the first shaft (2) in which the actuating element (38), when able to rotate in relation to the first shaft (2), exerts an actuating force acting in an exertion direction of the first gear (5) on the part (14), when there is a speed differential between the first shaft (2) and the first gear (5).

11. A device (1) for transmitting torque from a first shaft (2) to a second shaft (3) of a transmission, the device (1) comprising:

a first gear (5) being rotationally supported on the first shaft (2) by a bearing (4);

the first gear (5), in an assembled state, engaging a second gear (6) arranged on the second shaft (3);

the first gear (5) being shiftable into an activated state in which the first gear (5) is connected, in a rotationally fixed manner, to the first shaft (2);

a supporting mechanism (18) being associated with the first gear (5) via which a tilting moment acting on the first gear (5), at least in the connected state, in addition to the bearing (4) are transmitted to and supported by the first shaft (2);

the supporting mechanism (18) having a part (14) that is axially displaceable along the first shaft (2) in relation to the first gear (5) and, at least when the first gear (5) is in the connected state, being arranged between an area (5A) of the first gear (5) and the first shaft (2), and the tilting moment acting on the first gear (5) being transmitted to and supported by the first shaft (2);

the part (14) being displaced axially by an actuating mechanism (7) that is at least one of actuated mechanically, pneumatically and by an electric motor;

the actuating mechanism (7) having a ramp system (35) that has an axially displaceable actuating element (38) rotatably mounted on the first shaft (2) and being rotationally securable to the first shaft (2) by at least one displaceable pin (9, 37); and a spring mechanism (46) being located between the actuating element (38) and the part (14) by which a synchronization force, that compensates for a speed differential between the first gear (5) and the first shaft (2), is exerted on the part (14) when the first gear (5) is connected.

12. The device according to claim 11, wherein if a limit for the actuating force exerted on the part (14) by the actuating element is exceeded, a functional connection (47) between the spring mechanism (46) and the actuating element (38) inhibiting a relative movement between the actuating element (38) and the part (14) is disengaged and the part (14) is directly actuated by the actuating element (38) in the direction of the first gear (5).

13. A device (1) for transmitting torque from a first shaft (2) to a second shaft (3) of a transmission, the device (1) comprising:

a first gear (5) being rotationally supported on the first shaft (2) by a bearing (4);

the first gear (5), in an assembled state, engaging a second gear (6) arranged on the second shaft (3);

the first gear (5) being shiftable into an activated state in which the first gear (5) is connected, in a rotationally fixed manner, to the first shaft (2); and a supporting mechanism (18) being associated with the first gear (5) via which a tilting moment acting on the first gear (5), at least in the connected state, in addition to the bearing (4) are transmitted to and supported by the first shaft (2);

wherein the tilting moment acting on the first gear (5) is transmitted to the first shaft and supported there via a supporting element (29) fixedly connected to the first gear that engages a segment (30) of at least an approximately U-shaped cross section of a part (14) fixedly connected to the first shaft (2).

14. The device according to claim 13, wherein the supporting element (29) comprises a substantially plate shaped area axially within the at least approximately U-shaped segment (30) of the part (14), where the substantially plate shaped area has two plane surfaces (31, 32), each of which engage one of two plane surfaces (33 and 34, respectively) of the part (14) for supporting the tilting moment acting on the first gear (5).

15. The device according to claim 14, wherein the two plane surfaces (31, 32) of the substantially plate shaped area of the supporting element (29) and the plane surfaces (33, 34) of the part (14) of the supporting mechanism (18) are spaced from one another, when the first gear (5) is in a torque-free state.

16. The device according to claim 1, wherein the spring mechanism (16, 22B, 46) comprises a pair of springs (22A, 22B) which bias the first gear (5) into the first position which is a central position.

17. The device according to claim 1, wherein the spring mechanism (16, 22B, 46) biases the part (14) into the first position until an axial actuating force overcomes the bias of the spring mechanism (16, 22B, 46).

* * * * *